No. 850,835. PATENTED APR. 16, 1907.
J. E. HOLLAND.
ATTACHMENT FOR TRACTION ENGINES.
APPLICATION FILED APR. 18, 1906.
2 SHEETS—SHEET 1.
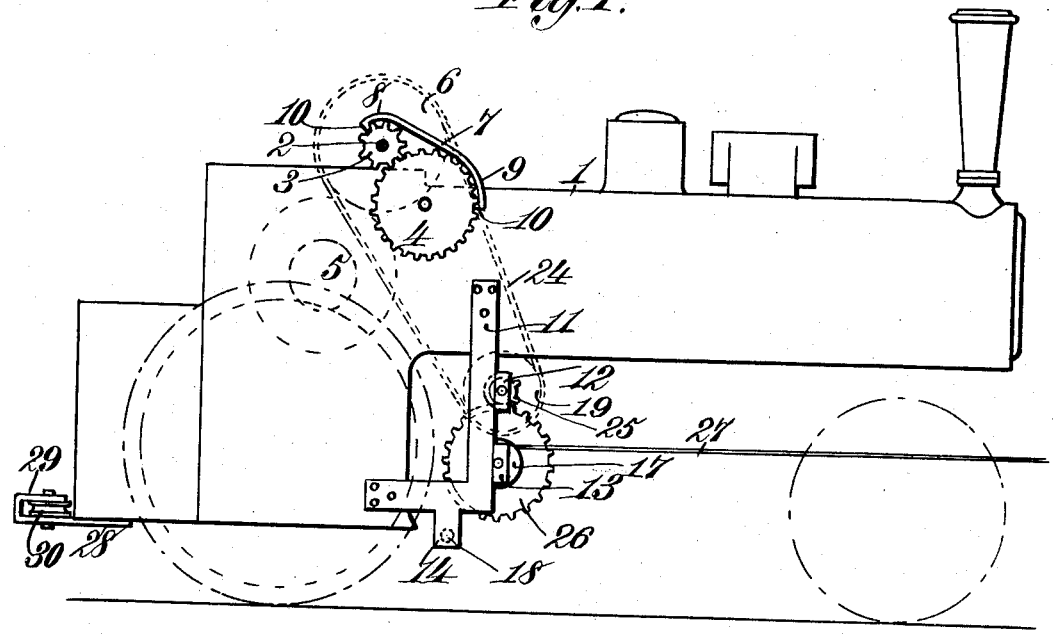
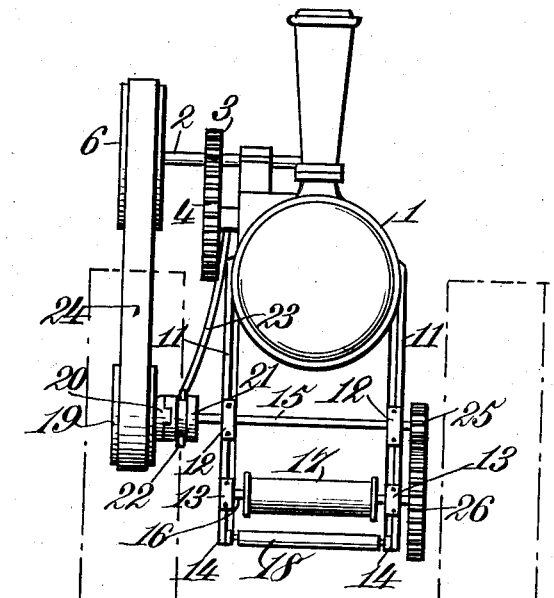
Witnesses.
Robert Everitt
E. E. Weaver
Inventor:
James E. Holland,
By James L. Norris
Atty.

No. 850,835. PATENTED APR. 16, 1907.
J. E. HOLLAND.
ATTACHMENT FOR TRACTION ENGINES.
APPLICATION FILED APR. 18, 1906.
2 SHEETS—SHEET 2.
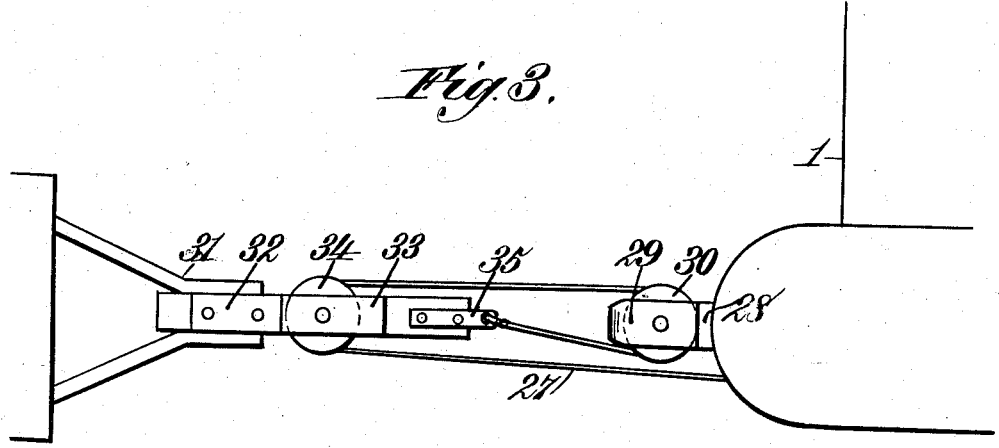
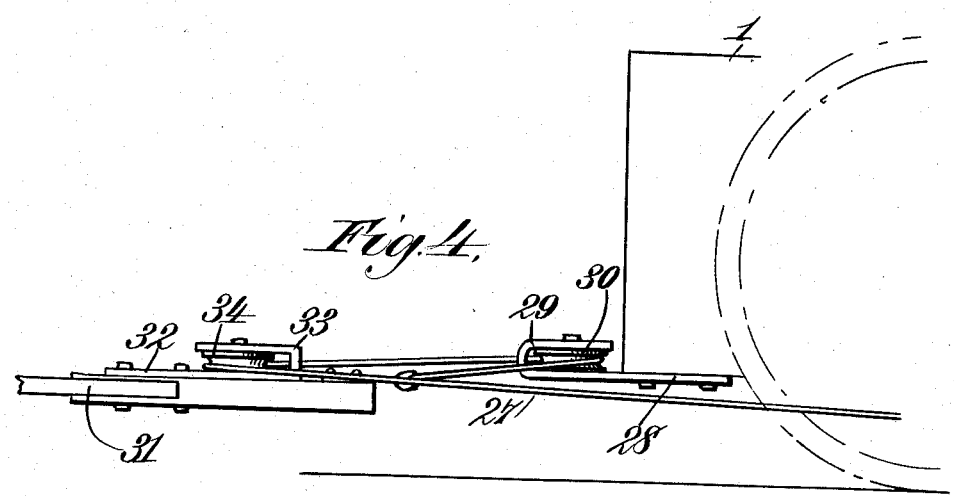

UNITED STATES PATENT OFFICE.

JAMES E. HOLLAND, OF WHITESBURG, GEORGIA.

ATTACHMENT FOR TRACTION-ENGINES.

No. 850,835.　　　Specification of Letters Patent.　　Patented April 16, 1907.

Application filed April 18, 1906. Serial No. 312,499.

*To all whom it may concern:*

Be it known that I, JAMES E. HOLLAND, a citizen of the United States, residing at Whitesburg, in the county of Carroll and State of Georgia, have invented new and useful Improvements in Attachments for Traction-Engines, of which the following is a specification.

This invention relates to attachments for traction-engines for the purpose of assisting the movement of the engine over soft road-beds or holes or gullies in a field or for drawing water drays or carts or threshing machinery or other devices over soft places in a road or uneven ground while the engine is held in fixed position.

In the employment of traction-engines for hauling water drays or carts, agricultural machinery, or other devices difficulty is frequently experienced by obstruction to practical movement or headway of the engine over sand or soft soil or uneven ground where the weight of the machine causes it to sink deeply into the ground or when the wheels cannot obtain sufficient purchase to move the engine or the device or devices attached thereto. To obviate this disadvantage and difficulty, the engine is provided with an auxiliary shaft and drum, together with a particular form of guide-roller and operating means which is connected with the driving-pulley of the engine to control the winding of a cable or rope on the drum. In connection with this particular attachment the rear of the traction-engine has a pulley supported thereby to coöperate with an analogous device carried by the tongue of the water dray or cart or other machine which is transported by the engine, the said tongue having such construction that it may be readily substituted for or replace the tongue or draft device usually employed in connection with a water-dray or agricultural machinery.

A further additional attachment consists of means for blocking a part of the gearing interposed between the engine-shaft and the traction-wheels to prevent rearward movement of the engine in the use of a portion of the foregoing attachments.

The invention also consists in the details of construction and arrangement of the several parts, which will be more fully hereinafter set forth.

In the drawings, Figure 1 is a side elevation of a traction-engine, showing enough of the operating gearing and mechanism to illustrate one operation in connection with a portion of the improved attachments. Fig. 2 is a front elevation of the engine, showing the main attachment and means for operating the same from the driving mechanism of the engine. Fig. 3 is a top plan view of a portion of the rear extremity of the engine and a tongue or draft device applicable to or forming a part of a water dray or tank or other machine which is transported by the engine. Fig. 4 is a side elevation of the tongue or draft device shown by Fig. 3.

Similar numerals of reference indicate corresponding parts in the several views.

The numeral 1 designates a traction-engine of any preferred type embodying a driving-shaft 2, carrying a pinion 3, meshing ordinarily with a drive-pinion 4, engaged by a power-transmitting pinion 5, in turn geared to a rack of the spider of the traction-engine wheel. This mechanism is well known and forms no part of the present invention. The engine is also equipped with a power wheel or pulley 6, operated in the usual manner, which, as will be more fully hereinafter specified, in the present instance, has an operation additional to that which is ordinarily performed by devices of this class in the usual traction-engine structures. When it is desired to block the engine and prevent backward movement thereof, a blocking-latch or coupling member 7 is used and has opposite curved extremities 8 and 9 with toothed terminals 10 to respectively engage the pinion 3 and the drive-pinion 4, the said blocking-latch or coupling member being readily applicable and removable. The teeth 10 of the blocking-latch or coupling member take in between the teeth of the pinions 3 and 4, and movement of the said pinions, and consequently the power-transmitting pinion 5, is obstructed, and the machine is thus held in stationary position and is particularly prevented from having rearward movement.

The main attachment embodies depending hangers or brackets 11, secured to the forward part of the engine or in advance of the fire-box and are preferably of angular contour, the lower horizontal members of said brackets extending rearwardly and secured to the opposite sides of the forward extremity of the said fire-box. The vertical member of each bracket has a plurality of bearings 12, 13, and 14 therein, the opposite bearings 12 being in transverse alinement to receive a drum-actuating shaft 15. The bearings 13 are also in transverse alinement and receive the opposite extremities of a spindle 16 of a drum 17. The bearings 14 are likewise alined and receive the opposite extremities of a combined antifrictional and elongated guide-roller 18, which is disposed below the bottom of the firebox. The combined antifrictional and guide roller 18 is disposed below the lower maximum projecting portion of the engine to give a clearance to the element which coöperates therewith and more fully hereinafter set forth.

On one end of the drum-actuating shaft 15 a power-transmitting pulley 19 is loosely held and has the inner end of its hub constructed as a clutch member 20 to coöperate with a companion clutch member 21, splined on the said shaft and slidable to and from the clutch member 20. The clutch member 21 is circumferentially grooved and engaged by the yoked end 22 of a shifting lever 23, running up and rearwardly at one side of the engine within convenient reaching distance of the operator. This clutch attachment will be readily understood, as it is of well-known construction, and it will also be appreciated that variations in the operation of the clutch may be adopted at will.

A belt 24 is trained over the pulley 19 and also over the power wheel or pulley 6 when the improved attachments are utilized. When these attachments are not in use, this belt 24 may be disengaged from the pulleys 6 and 19 and the power wheel or pulley 6 used, as in ordinary operations of the traction-engine, to receive a driving-belt running to the threshing-machine or other mechanism to be driven. During the use of the improved attachments, however, it may be frequently necessary to disengage the pulley 19 from its shaft 15, and under such circumstances the belt 24 will remain in engagement with the pulleys 6 and 19 and continue to operate without stopping the driving mechanism of the engine, but render the shaft 15 inactive.

On the end of the shaft 15 opposite that carrying the pulley 19 a pinion 25 is fixed and continually meshes with a spur-gear 26 on the adjacent end of the spindle 16 of the drum 17, and by means of this gearing the drum is rotated in a proper direction to wind a rope or cable 27, which may be projected either in advance of the front of the engine or rearwardly from the latter and pass down over and engage the roller 18.

At the rear of the engine, and preferably to one side of the center, a supporting-plate 28 is secured and is rebent on itself, as at 29, to form a bearing for a grooved wheel or pulley 30. The plate 28 is of such thickness that it will have considerable strength and durability to resist the pulling strain or tension brought to bear thereon, and the function of this part of the attachment is to assist in drawing a water-cart, agricultural machine, or other device toward the engine through the medium of the cable 27.

The improved attachments or equipments of the engine also include a tongue or draft device 31, which may be a continuous part of a water dray or cart or a threshing-machine or be applicable to the latter and replace the ordinary form of tongue or draft device now in use. On this tongue 31 a combined supporting and bearing plate 32 is secured and has its forward extremity 33 rebent to partially inclose a grooved pulley 34. To the forward extremity of the tongue 31 a perforated coupling-bar 35 is secured and under ordinary conditions may be used as a means for directly attaching the tongue 31, when forming a continuous part of the dray or machine with which it is used, to the rear extremity of the traction-engine or to a corresponding device secured to the rear end of the supporting-plate 28, as may be desired.

As before indicated, the improved attachments are adapted to be utilized with the rope or cable 27 to draw or transport the engine over soft or muddy portions of a road-bed or through gullies or uneven surfaces in a field or soft ground generally, and when this operation is to be performed the cable 27 is projected in advance of the engine directly from the drum 17 and terminally attached to a post, tree, or other convenient device, which serves as an anchorage, and after such attachment of the rope or cable the drum 17 is set in motion to wind the rope or cable thereon in a proper direction and causes the traction-engine to be effectively moved over the surface, which under ordinary movement of the traction-engine does not give sufficient purchase to the traction-engine wheels. When the traction-engine is thus moved alone, any machine or water dray or cart that may be usually transported therewith is uncoupled and remains in one position until the engine has been placed on firm ground. The cable is then detached from the post, tree, or other device which has served as an anchor to assist in moving the engine and is passed downwardly over the roller 18 and rearwardly from the engine to the tongue 31, where it is trained about the grooved pulley 34, then forwardly over the pulley 30 and terminally attached to the coupling-bar 35. The locking-latch or coupling member 7 is then placed in engagement with the pinions 3 and 4, and the engine thereby held against rearward movement and the weight of the engine relied upon as a resistance to overcome the counteracting draft of the water dray or cart or machine adapted to be drawn in close relation to the engine. After the parts have been thus arranged the drum 17 is again set in motion and the rope or cable 27 gradually wound therearound and traverses the pulleys 30 and 34 with antifrictional advantages and at the same time exerting a draft or pulling strain on the tongue until the latter has arrived in close position with respect to the rear of the engine and may be readily coupled up in the usual manner. The cable 27 is then released from the tongue 31 and the pulley 30 and wound upon the drum 17, and the latter is rendered inactive by operating the clutch connection for the pulley 19, so as to allow the latter to run loose on the shaft 15.

The several attachments are so applied that they will not interfere with any part of the usual operating organization of the engine or requiring any change in well-known traction-engine constructions. Ordinarily in attachments of this class drums and other devices have been made an additional part of the usual mechanism of a traction-engine, and such additions frequently require a material reorganization of the said mechanism.

Further modifications in the details, proportions, and dimensions of the several parts of the improved attachments may be adopted without in the least departing from the spirit of the invention.

Having thus described the invention, what is claimed is—

1. A traction-engine having an attachment in advance of the fire-box for assisting in drawing it over soft or uneven surfaces, consisting of depending supporting means having an upper shaft with a driving-pulley and gear on opposite ends, an intermediate drum having a gear on one extremity meshing with the gear of the shaft, an antifrictional roller held in the lower part of the supporting means at a plane below the maximum dependence of the fire-box bottom, the shaft carrying the driving-pulley being operative from the driving mechanism of the engine, and a rope or cable coöperating with the drum.

2. The combination with a traction-engine, of supporting means connected to the forward portion thereof, a drum rotatably mounted in the said supporting means, a lower antifrictional roller held below the drum in the supporting means, a pulley device attached to the rear extremity of the engine, a draft device having a pulley disposed thereon, means for operating the drum from the driving mechanism of the engine, and a rope or cable coöperating with the drum and movable over the roller and through the said pulleys, the cable being terminally attached to the forward extremity of the tongue in advance of the pulley on the latter.

3. The combination with a traction-engine, of a transversely-extending drum supported by the forward portion thereof, means for operating the drum from the driving mechanism of the engine, a horizontally-disposed pulley carried by the rear extremity of the engine, a draft device for attachment to machines or vehicles transported by the engine and having a pulley horizontally disposed thereon, and a rope or cable coöperating with the drum and engaging the pulleys on the engine and draft device and terminally secured to the forward extremity of the latter.

4. The combination with a traction-engine, of a drum held by the forward portion thereof, means for operating the said drum from the driving mechanism of the engine, a draft device attachable to a machine or vehicle adapted to be transported by the engine and having thereon a pulley, and a rope or cable coöperating with the drum and engaging the said pulley and terminally secured to the adjacent extremity of the draft device.

5. The combination with a traction-engine having the usual driving mechanism including intermeshing gears, of a drum supported by the forward portion of the engine, means connected to the driving mechanism of the engine for operating the drum, a rope or cable engaging the drum and operative to draw machinery or vehicles toward the engine, and a blocking-latch having curved extremities and terminal teeth to engage portions of the meshing gear of the driving mechanism to hold the traction-wheels of the engine in stationary position.

6. The combination with a traction-engine having driving mechanism including meshing gears, of a blocking-latch removably applicable to portions of said gears and having opposite curved extremities and terminal teeth.

In testimony whereof I have hereunto set my hand in presence of two subscribing witnesses.

JAMES E. HOLLAND.

Witnesses:
C. R. TURNER,
H. F. MERRELL.